US007002987B2

(12) United States Patent
Shaughnessy et al.

(10) Patent No.: US 7,002,987 B2
(45) Date of Patent: Feb. 21, 2006

(54) COMMON SERVICES AND APPLICATIONS AGENT

(75) Inventors: Mark L. Shaughnessy, Phoenix, AZ (US); Peter J. Armbruster, Chandler, AZ (US); Bradley R. Schaefer, Chandler, AZ (US)

(73) Assignee: Motorola, Inc., Schaumburb, IL (US)

( * ) Notice: Subject to any disclaimer, the term of this patent is extended or adjusted under 35 U.S.C. 154(b) by 931 days.

(21) Appl. No.: 09/878,080

(22) Filed: Jun. 7, 2001

(65) Prior Publication Data

US 2002/0186684 A1 Dec. 12, 2002

(51) Int. Cl.
*H04J 3/16* (2006.01)

(52) U.S. Cl. ........................ 370/466; 370/338; 370/352

(58) Field of Classification Search ................ 370/401, 370/400, 467, 466, 465, 356, 352
See application file for complete search history.

(56) References Cited

U.S. PATENT DOCUMENTS 6,438,114 B1 * 8/2002 Womack et al. ............ 370/329
6,584,093 B1 * 6/2003 Salama et al. .............. 370/351
6,721,565 B1 * 4/2004 Ejzak et al. ................ 455/436
6,735,621 B1 * 5/2004 Yoakum et al. ............ 709/218
6,751,652 B1 * 6/2004 Thomas ...................... 709/204
6,795,444 B1 * 9/2004 Vo et al. ..................... 370/401
6,801,781 B1 * 10/2004 Provost et al. .............. 455/466
6,829,254 B1 * 12/2004 Rajahalme et al. ......... 370/535
6,842,447 B1 * 1/2005 Cannon ...................... 370/352

FOREIGN PATENT DOCUMENTS

GB 2356521 A 5/2001
WO WO 00/76107 A2 12/2000
WO WO 00/76158 A1 12/2000
WO WO 00/77992 A1 12/2000

OTHER PUBLICATIONS

Schulzrinne H. et al., "Interworking Between SIP and INAP", XP002901410, Jul. 2000, whole document.

* cited by examiner

*Primary Examiner*—Bob A. Phunkulh
(74) *Attorney, Agent, or Firm*—Frank J. Bogacz; Kevin D. Wills

(57) ABSTRACT

A common services and applications agent (10) handles a number of input sources of voice and data information (11–16). These sources of voice and data information are converted (20) to session initiation protocol. The session initiation protocol for the voice and data information is provided to the communication network (40).

5 Claims, 1 Drawing Sheet

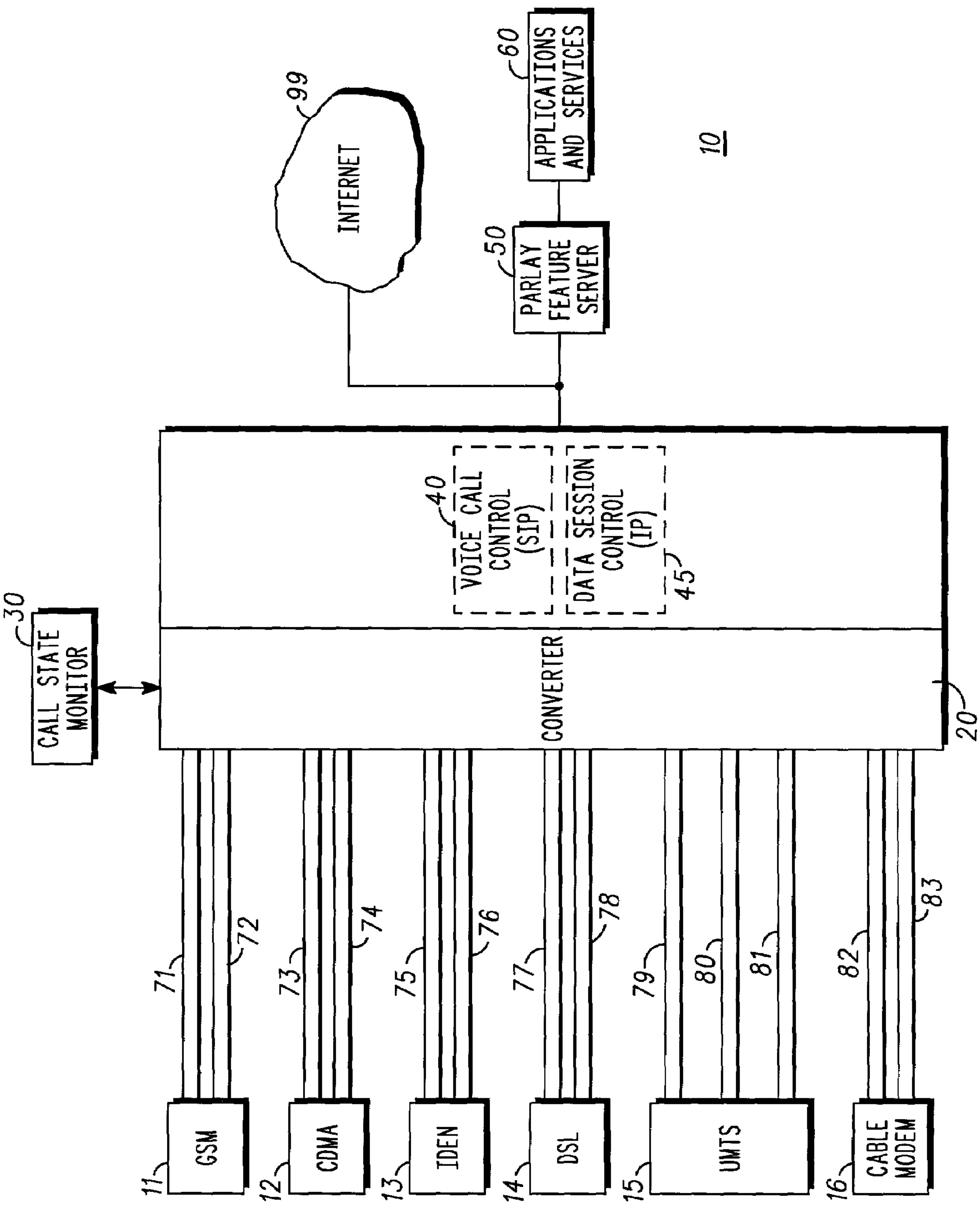
INTERNET
99
APPLICATIONS AND SERVICES
60
PARLAY FEATURE SERVER
50
10
VOICE CALL CONTROL (SIP)
40
DATA SESSION CONTROL (IP)
45
CONVERTER
20
CALL STATE MONITOR
30
GSM
11
CDMA
12
IDEN
13
DSL
14
UMTS
15
CABLE MODEM
16
71
72
73
74
75
76
77
78
79
80
81
82
83

COMMON SERVICES AND APPLICATIONS AGENT

BACKGROUND OF THE INVENTION

The present invention pertains to communication networks and more particularly to a network arrangement which permits the sharing of applications and service processing by both voice and data transmissions.

Modern communication networks separate voice and data (broadband) into two components which are separately handled. Various hardware and application handlers are written specifically for each of the different communication forms (voice and data). Such networks require complex handling and structure as well as the separate processing of the communication forms. A number of various users wish to transmit over various communications protocol voice and data through modern communication networks. Each different communication protocol requires separate handling by the communication network. The software which processes the communication information (packets) must be written in such a fashion as to handle the many different protocols input to the network. This makes for large, complex communication networks and software which operates these networks that is specifically tailored to handle each information protocol.

Such networks must be necessarily complex since they provide separate handling for each protocol of voice and data packets. Lack of commonality increases the amount of software which must be written to handle processing of the information through the network and an increase of real time to perform the required hand shaking with other networks. Complex operating software must be written for the networks which is protocol specific and is unable to share any common network services or applications.

What is needed is an arrangement for promoting the sharing of voice and data services by a network for commonly processing the voice and data information presented to the network.

BRIEF DESCRIPTION OF THE DRAWING

The single drawing FIGURE is a block diagram of an arrangement for a common services and application agent for a communication network in accordance with the present invention.

DESCRIPTION OF THE PREFERRED EMBODIMENT

The single drawing FIGURE included herewith depicts the common application service agent arrangement 10 in accordance with the present invention. A number of distinct inputs 11–16 include voice data, packet data, packet voice data. Each of the data sources 11–16 send the voice and data information through the network. Various distinct handling apparatus is required for processing each of the different protocols associated with the voice and data. In the present invention, streamlining of apparatuses and processing is achieved by converting each of the input protocols to a session initiation protocol for use via the internet. Converter 20 provides for each of the conversions from the input protocol shown by sources 11–16 to the session initiation protocol output by converter 20.

Block 11 represents an input source of a Global System for Mobile (2.5 generation) cellular access network. Block 11 supports circuit voice signaling using a GSM 4.08 protocol over an A interface 71. Global system mobile (GSM) packet data signaling is provided via 4.08 signaling on a Gb interface 72. The A and Gb interfaces 71 and 72 are shown in publication Definition of these protocols may be found in ETSI: GSM 04.08: Digital cellular telecommunications system (Phase 2+); Mobile radio interface layer 3 specification.

Code division multiple access (CDMA) network 12 is a cellular access network. CDMA 12 represents an IS-634 cellular network. The CDMA network 12 supports A1 protocol for circuit voice over an A1 interface 73. The CDMA network 12 supports packet data signaling via an A9 interface 74. Definition of these protocols may be found in 3GPP2 A.S0001-A: 3GPP2 Access Network Interfaces Interoperability Specification.

Integrated dispatch enhanced network (IDEN) 13 is a cellular access network. IDEN network 13 supports circuit voice signaling using a GSM 4.08 protocol over A interface 75. IDEN network 13 supports packet data signaling via a LAPi protocol on a Mobile Data Gateway (MDG) interface 76. LAPi is based on Link Access Protocol D-channel (LAPD), with extensions for iDEN. GSM 4.08 protocol over A interface is defined in ETSI: GSM 04.08: Digital cellular telecommunications system (Phase 2+); Mobile radio interface layer 3 specification. IDEN packet data signaling via a LAPi protocol is defined in Motorola Publication 68P81127E95-C: IDEN RF Interface, Layer 3 Procedures for Dispatch and Packet Data Operation, for example.

Digital subscriber line (xDSL) network 14 is a public switch telephone network based access. xDSL may have many forms. The x is replaced by a specific letter representing the form of DSL. DSL stands for Digital Subscriber Line. The x can be an A (asynchronous), H (high speed), or S (symmetric). For example definition of an ADSL may be found in ANSI T1.413-1998 Network to Customer Installation Interfaces—Asymmetric Digital Subscriber Line (ADSL) Metallic Interface.

DSL network 14 provides for integrated services digital network (ISDN) signaling via traditional copper wire interface 77. DSL network 14 supports packet data signaling via an internet protocol packet routing via copper wire interface 78. Both voice and data signaling is supported over a three channel digital line that links a customer terminal to the telephone company switch via twisted pair copper wires. ISDN is defined in Integrated Services Digital Network—ITU-T Q.761, Signaling System No. 7—ISDN User Part functional description.

UMTS (Universal Mobile Telephone System) 15 is a cellular access network. UMTS 15 provides circuit voice signaling via a GSM 24.008 protocol over an IuCS interface 79. UMTS network 15 is a third generation (3G) network which provides packet data signaling via an internet protocol packet routing on an IuPS interface 80. UMTS network 15 may also provide packet voice signaling via a session initiation protocol (SIP) signaling on IuPS interface 81. GSM 24.008 protocol over an IuCS interface is defined in ETSI TS 124 008: Digital cellular telecommunications system (Phase 2+) (GSM); Universal Mobile Telecommunications System (UMTS); Mobile radio interface layer 3 specification, Core Network protocols—Stage 3. (3G TS 24.008). An IP packet is defined at IETF: RFC791 Internet Protocol.

Cable modem network 16 provides packet voice signaling via HFC interface 83. HFC indicates hybrid fiber coax. The packet voice signaling may be provided using NCS (network call signaling) or DCS (distributed call signaling). NCS is a call control signaling protocol based on media gateway control protocol (MGCP). DCS is a call control signaling protocol based on session initiation protocol (SIP). Cable modem network 16 provides packet data signaling via internet protocol packet data routing via HFC interface 82.

The specifications used for call setup over HFC are:

1. ITU-T J.112 "transmission of television, sound programme and other multimedia signals"

2. Packet Cable spec "SP-CMCI-I03-991115, "Cable Modem to Customer Premise Equipment Interface Specification"

3. Packet Cable spec "SP-CMTS-NSII01-960702, "Cable Modem Termination System—Network Side Interface Specification"

4. Packet Cable spec "PKT-SP_EC-MGCP-102-991201 "Packet Cable Network Based Call Signaling Protocol Specification".

Each of the network interfaces 71–83 is coupled from their respective networks to converter 20. The control protocols of each of the above mentioned protocols are converted by converter 20 into control SIP (session initiation protocol) in the preferred embodiment. In another embodiment, converter 20 converts the user (bearer) traffic protocols of each protocol into a common user traffic protocol as well.

Converter 20 examines each of the incoming messages and translates the control message to one or more session initiation protocol messages. Since there may not be a one to one message correspondence between each of the input protocols and SIP, call state monitor 30 will track and record what state each of the various calls are in the conversion process. Converter 20 will then output each of the converted messages via voice call control 40 or data session control 45 to the internet 99 for further processing.

Converter 20 is further coupled to Parlay feature server 50 which is in turn coupled to applications and services 60. Parlay feature server 50 is an interface between the applications and services 60 and the converter 20. Parlay feature server 50 provides access to various call states and other information so that the applications and services 60 may perform their service functions.

Examples of supplementary services include call forwarding, call waiting and call barring. Each of these services may be implemented within the applications and services module 60 just once and used for each of the different networks connected to converter 20. This commonality of applications and services would eliminate writing a specific application or service function for each unique kind of protocol that could be passed through the network for routing.

The above-mentioned services may be used by all of the circuit voice and packet voice protocols input to converter 20. The services may also incorporate extensions for multimedia adaptation. As an example, a call forwarding function may forward to a web page where the calling party might be given multiple options for call treatment such as leaving a video clip.

In applications and services module 60, new applications can be written only once and accessed by circuit voice protocols, packet voice protocols and packet data protocols (input on interfaces 71–83). An example of one such service would be a local weather service. This local weather service would be spoken to the subscriber for voice services and a weather map provided to subscribers for data services. Other examples of applications may include, for example, an application which provides upon request to the subscriber a list of the closest shops or theaters based on their current location. In addition, traffic congestion or access may be spoken instructions or information or maps and alternate route data transmitted in data form. These and a vast number of other applications may be included in the applications and services module 60.

The advantage of such a system is that the application would only have to be written once for a voice type access and once for a data type access. Each of the various network types (11–16) would then access this application through converter 20 commonly, thereby saving vast amounts of effort in programming and using such applications and services 60 by many different protocol interfaces. Thereby, a streamlined set of applications and services 60 may be provided to enhance the features provided by the telephone operating companies or internet service companies. Since these applications and services are written just once, time and cost savings are obtained.

The invention described herein above allows third generation and 2.5 generation mobile networks and various other networks to combine voice services, call control logic with data control logic, into a single controller. This combination eliminates redundant control and allows sharing of pertinent data such as call state, location information and subscription information. Also, supplementary services and applications may be written once for use on various voice and data applications such as voice over internet protocol (VOIP).

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A common services and applications agent for a communication network, the common services and applications agent comprising:

a plurality of communication networks, each communication network having voice and data information in a respective one of a plurality of communication protocols;

a converter coupled to the plurality of communication networks to receive the voice and data information from the plurality of communication networks and convert the respective protocol of the voice and data information from each of the communication networks to a session initiation protocol; and a plurality of applications and services, each capable of performing a respective service function on voice and data information in the session initiation protocol, coupled to the converter to receive the voice and data information in the session initiation protocol from the converter, each of the plurality of applications and services to perform the respective service function on the voice and data information from each of the plurality of communication networks.

2. A common services and applications agent as claimed in claim 1, wherein there is further included a feature server for providing state information to the plurality of applications and service.

3. A common services and applications agent as claimed in claim 1, wherein the converter further comprises:

means for converting control protocols of the plurality of protocols to a control session initiation protocol; and means for converting user traffic protocols of the plurality of protocols to a common user traffic protocol.

4. In a voice over internet protocol environment, a common services and applications agent for a mobile communication network, the common services and applications agent comprising;

a plurality of communication networks, each communication network having a voice and data information in a respective of a plurality of communication protocols;

a converter coupled to the plurality of communication networks to receive the voice and data information from the plurality of communication networks and convert the respective protocol of the voice and data information from each of the communication networks to a session initiation protocol;

means for providing state information of the session initiation protocol to the common services and applications agent;

a plurality of applications and services, each capable of performing a respective service function on voice and data information in the session initiation protocol, coupled to the converter to receive the voice and data information in the session initiation protocol from the converter, each of the plurality of applications and services to perform the respective service function on the voice and data information from each of the plurality of communication networks.

5. A common services and applications agent as claimed in claim 4, wherein there is further included a feature server for providing state information to the plurality of applications and service.

* * * * *

UNITED STATES PATENT AND TRADEMARK OFFICE

CERTIFICATE OF CORRECTION

PATENT NO. : 7,002,987 B2
APPLICATION NO. : 09/878080
DATED : February 21, 2006
INVENTOR(S) : Shaughnessy et al.

It is certified that error appears in the above-identified patent and that said Letters Patent is hereby corrected as shown below:

Column 4, Line 61, delete "service" and insert --services-- therefore.

Signed and Sealed this

Twenty-sixth Day of September, 2006

JON W. DUDAS
*Director of the United States Patent and Trademark Office*